Oct. 12, 1926.

T. O. POE 1,602,449

TUBULAR WELL SCREEN

Filed April 27, 1923 2 Sheets-Sheet 1

Inventor
Thomas O. Poe
By Frease and Bond
Attorneys

Oct. 12, 1926.                                              1,602,449
                        T. O. POE
                   TUBULAR WELL SCREEN
              Filed April 27, 1923        2 Sheets-Sheet 2

Thomas O. Poe

Patented Oct. 12, 1926.

1,602,449

UNITED STATES PATENT OFFICE.

THOMAS O. POE, OF MASSILLON, OHIO, ASSIGNOR TO THE OHIO DRILLING COMPANY, OF MASSILLON, OHIO, A CORPORATION OF OHIO.

TUBULAR WELL SCREEN.

Application filed April 27, 1923. Serial No. 635,029.

The invention relates to screens for tubular well casing and has for its objects to provide a simple and efficient construction which will be effective in excluding gravel and stones from lodging in the openings of the tubular casing and restricting the volume of water entering the same.

The above and other objects are attained by providing a steel tube with a series of longitudinal rows of apertures admitting water thereto, and by providing a series of angle irons longitudinally secured upon the periphery of the tube, and preferably secured thereto at intervals, the angle irons being located over the longitudinal rows of apertures and provided with a series of kerfs or slots for admitting water through the same and into the apertures in the tube, a narrow slot being preferably left between the edges of the angle bar and the tube so as to admit water under the edges of the bars as well as through the transverse kerfs therein.

An embodiment of the invention thus set forth in general terms, is illustrated in the accompanying drawings, in which—

Figure 1:
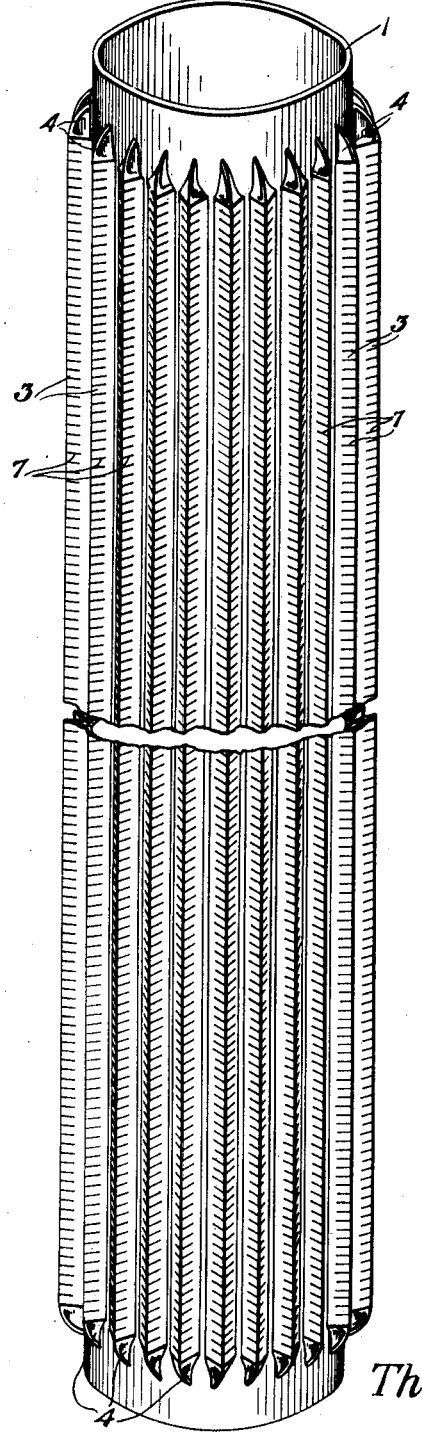
Figure 3:
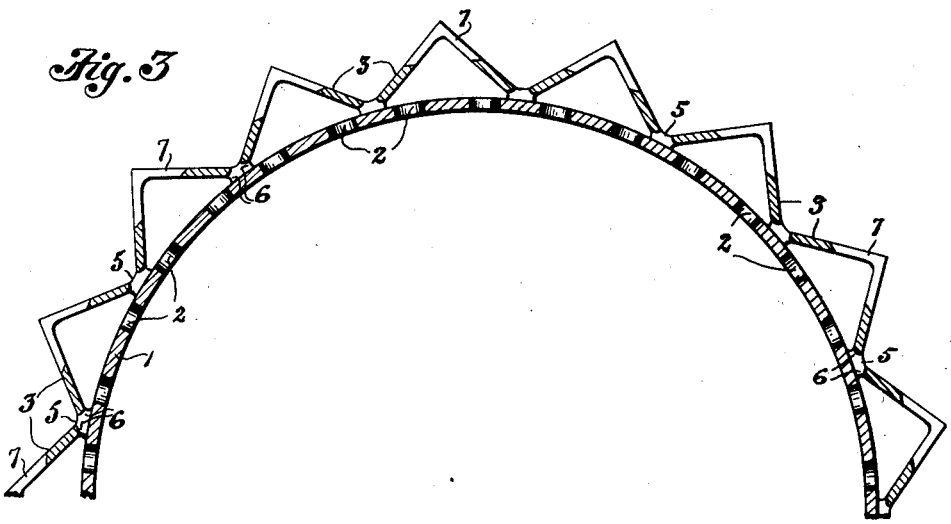
Figure 2:
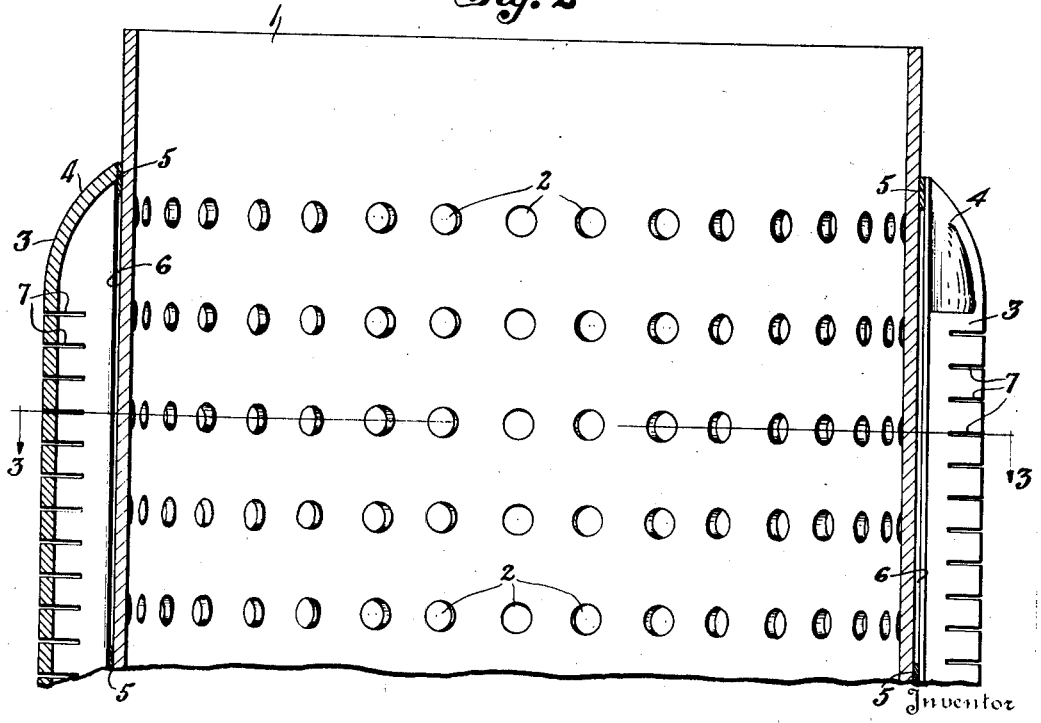

Figure 1 is a perspective view of a section of tubular well casing formed in accordance with the invention;

Fig. 2, an enlarged, longitudinal, sectional view through the upper portion of the same; and Fig. 3, a section on the line 3—3, Fig. 2.

Similar numerals of reference indicate corresponding parts throughout the drawings.

The body of the tube preferably comprises a steel tube 1 provided with the longitudinal rows of apertures 2 for admitting water into the same. These apertures, however, are of such size that, if they are not shielded by a screen, round stones may partially enter and close the same, and prevent the proper volume of water from being drawn into the casing.

After the gravel packing around the casing has been sucked free of the fine sand, the coarser sands and gravel will lodge in the apertures 2, often clogging a great many of these apertures and materially reducing the volume of water admitted to the casing.

The present improvement provides for a series of angle irons 3 closed at their upper and lower ends as at 4 and longitudinally secured to the tube, each angle iron covering one or more longitudinal rows of the apertures 2.

Each angle iron is preferably secured at intervals to the periphery of the tube as by spot welding or the like, indicated at 5, providing a narrow slot 6 between the edge portion of the angle iron and the periphery of the tube, between the attaching points, so as to admit water under the edges of the angle irons and through the apertures 2 into the casing.

A series of transverse kerfs or slots 7 is cut across the angle of each iron, for admitting water through the angle portion of the same, whence the water may find its way through the apertures 2 into the body of the casing.

The combined area of the angle kerfs and edge slots of the angle bars is equal to or greater than the area of the apertures in the tube; hence there is never any restriction in the volume of water finding its way to and through the apertures into the body of the tubular casing.

The angles presented by the angle irons prevent lodging of stones or gravel through the slots therein and owing to the restricted width of the kerfs and slots, gravel or stones will not close or clog the same as they will a round aperture.

After the gravel packing around the casing has been sucked free of the fine sand, the coarser sands and gravel and stones will lodge around the angle irons, without closing the transverse kerfs therein, thereby permitting the free access of water into the tube.

It should be understood that the casing may be made in sections of suitable length, the ends thereof being secured together in any well known manner. The longitudinal angle irons secured to the tube, not only perform the screening function above described, but they also serve to strengthen the tube longitudinally. As the apertures in the tube are larger than the width of the kerfs and slots, all sand which passes through the kerfs and slots will pass on through the apertures, without lodging between the angle bars and the tube.

I claim:

1. A tubular well screen including a tubular casing provided with rows of inlet passages, and angle irons having their free edges connected to the periphery of the casing covering the inlet passages and provided with a plurality of kerfs extending across the angles of the irons.

2. A tubular well screen including a tubular casing provided with longitudinal rows of inlet passages, and longitudinal angle irons having their free edges connected to the periphery of the casing covering the inlet passages and provided with a plurality of kerfs extending across the angles of the irons.

3. A tubular well screen including a tubular casing provided with rows of inlet passages and angle irons having their free edges connected to the periphery of the casing covering the inlet passages and provided with a plurality of kerfs extending across the angles of the irons.

4. A tubular well screen including a tubular casing provided with rows of inlet passages, and longitudinal angle irons on the periphery of the casing covering the inlet passages and provided with a plurality of restricted slots, the angle irons being closed at both ends.

5. A tubular well screen including a tubular casing provided with rows of inlet passages and angle irons on the periphery of the casing covering the inlet passages, there being restricted slots between the edges of the angle irons and the periphery of the casing, and each angle iron being provided with a plurality of kerfs extending across the angles of the irons.

6. A tubular well screen including a tubular casing provided with rows of inlet passages, and angle irons on the periphery of the casing covering the inlet passages, the edges of the angle irons being spot welded at spaced intervals to the casing to form restricted slots between the welds and the irons having kerfs across the angles thereof.

THOMAS O. POE.